United States Patent
Dorling et al.

(10) Patent No.: US 7,347,671 B2
(45) Date of Patent: Mar. 25, 2008

(54) TURBINE BLADE TURBULATOR COOLING DESIGN

(76) Inventors: Kevin Dorling, 25 Stanway Road, Shirley, Solihull B90 3JD (GB); John MacDonald, 6 Wayne Close, Swindon SN25 4WL (GB)

( * ) Notice: Subject to any disclaimer, the term of this patent is extended or adjusted under 35 U.S.C. 154(b) by 0 days.

(21) Appl. No.: 10/528,896

(22) PCT Filed: Sep. 25, 2003

(86) PCT No.: PCT/GB03/04094

§ 371 (c)(1), (2), (4) Date: Oct. 27, 2005

(87) PCT Pub. No.: WO2004/029416

PCT Pub. Date: Apr. 8, 2004

(65) Prior Publication Data

US 2006/0120868 A1    Jun. 8, 2006

(30) Foreign Application Priority Data

Sep. 26, 2002 (GB) ................................. 0222352.7

(51) Int. Cl.
F01D 5/18 (2006.01)
(52) U.S. Cl. .................................................. 416/97 R
(58) Field of Classification Search .............. 416/96 R, 416/97 R; 415/115
See application file for complete search history.

(56) References Cited

U.S. PATENT DOCUMENTS

| 4,416,585 | A | 11/1983 | Abdel-Messeh |
| 5,395,212 | A | 3/1995 | Anzai et al. |
| 5,468,125 | A | 11/1995 | Okpara et al. |
| 5,695,321 | A * | 12/1997 | Kercher ................ 416/97 R |
| 5,919,031 | A | 7/1999 | Hall et al. |
| 6,068,445 | A * | 5/2000 | Beeck et al. ............ 416/96 R |
| 6,343,474 | B1 * | 2/2002 | Beeck et al. ............... 60/752 |
| 6,612,808 | B2 * | 9/2003 | Lee et al. ................. 415/175 |
| 6,672,836 | B2 * | 1/2004 | Merry .................... 416/97 R |
| 2006/0239820 | A1* | 10/2006 | Kizuka et al. .......... 416/97 R |

FOREIGN PATENT DOCUMENTS

| EP | 0 852 285 A1 | 7/1998 |
| EP | 0 939 196 A2 | 9/1999 |

* cited by examiner

Primary Examiner—Edward K. Look
Assistant Examiner—Nathan Wiehe
(74) Attorney, Agent, or Firm—Tarolli, Sundheim, Covell & Tummino LLP (57) ABSTRACT

A turbine blade (10) includes internal channels (16) which provide a flow passage for a cooling medium to assist in cooling the blade (10) when in use, wherein the channels (16) include a plurality of turbulence promoting ribs (28, 60, 64, 70) mounted on the wall surfaces (44, 62, 66, 72) thereof. Each rib (28, 60, 64, 70) comprises two rib portions (30, 32) joined at one end to form a chevron junction (34), wherein the chevron junction (34) defines an angle (36) of between 80° and 120° and is directed into the flow of the cooling medium through the channels (16). Each rib portion (30, 32) of a rib (28, 60, 64, 70) defines a gap (40, 42) therein.

50 Claims, 4 Drawing Sheets

TURBINE BLADE TURBULATOR COOLING DESIGN

The present invention relates to turbomachinery, and in particular, but not exclusively, to turbine blades for use in gas turbine engines.

Gas turbine engines are used in a number of applications, including aircraft propulsion systems and power generation systems and the like. Typical gas turbine engines generally consists of three components: a compressor, a combustion chamber, and a turbine unit, wherein the compressor and the turbine unit are mounted on the same shaft. In use, air is compressed by the compressor, is fed into the combustion chamber where it is mixed with fuel and the mixture is ignited, and the exhaust gases produced are then expanded through the turbine unit to drive the shaft and produce shaft work. In power generation applications, the shaft work produced is used to drive the compressor and turn electrical generators, often via a gearing system.

Conventional turbine units comprise a plurality of stages, each stage usually consisting of two sets of blades arranged in an annulus, the first set being stator or nozzle blades which are rotationally fixed with respect to the casing of the turbine, and the second set being rotor blades which are mounted on the shaft and rotate therewith. The number of stages in a turbine unit is selected in accordance with, for example, considerations of stage mechanical loading and thermodynamic performance. Additionally, the number of stages may be determined by the required pressure ratio from turbine inlet to outlet.

Turbine efficiency is an important factor in the design of any gas turbine engine and one method of increasing the performance characteristics involves maximising the temperature of the gas at the turbine inlet. However, increasing the temperature of the gas used to drive the turbine produces serious mechanical and thermal stressing problems in the turbine blades, and the temperature of the gas is limited by the physical properties of the blade material, such as melting point and yield strength and the like.

Various advancements in materials have been made for use in high pressure and temperature turbines, however, these are extremely costly due to the complex formation process, for example, such as uni-directional crystallisation.

It is therefore common practice to minimise the thermal stress by cooling the blades during operation by passing cooling air bled from the compressor externally and internally of the blades, such that higher operational temperatures may be achieved, and the service life span of the blades may be increased. A number of blade designs exist which allow a particular cooling air flow regime to be utilised to allow a combination of, for example, convection cooling, impingement cooling and film cooling in order to improve the heat transfer properties between the blade and the cooling air. However, the actual shape or design of a blade is often determined by a compromise between aerodynamic and integrity requirements. Cooling primarily affects the integrity considerations both in terms of controlling the thermal stresses and maintaining the operating temperature of the material within acceptable limits to minimise creep and corrosion.

It is among the objects of the present invention to provide a turbine blade having improved cooling.

According to a first aspect of the present invention, there is provided a turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, wherein each rib comprises two rib portions joined at one end thereof to form a chevron junction, said chevron junction defining an angle of between 80° and 120° between the two rib portions and being directed into the flow of the cooling medium within the at least one channel, and wherein each rib defines at least one gap therein.

Thus, the turbine blade provides for improved heat transfer between the blade and the cooling medium due to the presence and form of the ribs within the at least one channel.

Preferably, one rib portion is disposed at an angle of 120° from the other rib portion, i.e. the chevron junction angle between the rib portions is preferably 120°.

In a preferred embodiment of the present invention, the at least one channel has a substantially triangular cross-section. The at least one channel may alternatively have a substantially circular cross-sectional shape, or any cross-sectional shape as would be considered suitable by a person of ordinary skill in the art.

Preferably, adjacent ribs are aligned such that adjacent chevron junctions are longitudinally aligned with respect to the at least one channel. Alternatively, adjacent ribs may be misaligned such that adjacent chevron junctions are longitudinally offset.

Advantageously, the ribs may be mounted on opposing sides of the at least one channel, and each opposing rib may be laterally aligned with respect to the at least one channel. Alternatively, the ribs may be laterally offset.

Preferably, the at least one gap of each adjacent rib are longitudinally aligned with respect to the at least one channel. Alternatively, the at least one gap in each adjacent rib may be longitudinally offset.

In a one embodiment of the present invention, each rib may define at least two gaps. Preferably, at least one gap is provided in one rib portion, and at least one gap is provided in the other rib portion.

Preferably, the centre of each gap in each rib portion is located approximately between 60% and 70%, and preferably around two thirds, along the length of each rib portion from the chevron junction.

Conveniently, at least one of the ribs may extend substantially perpendicular from the surface of the at least one channel. Alternatively, or additionally, at least one of the ribs may extend from the surface of the at least one channel at a non-perpendicular angle. Preferably, at least one of the ribs may extend from the surface of the at least one channel at an angle of between 45° to 135° with respect to the direction of flow through the at least one channel. More preferably, the at least one rib extends at an angle of between 60° to 90°. Most preferably, the at least one rib extends at an angle of between 62° to 79°. Thus, in a preferred embodiment of the present invention, at least one rib extends from the surface of the at least one channel and is directed into the direction of flow through the at least one channel.

Advantageously, the ribs may have a square cross-section. Alternatively, the ribs may have a cross-section in the form of a general parallelogram. Alternatively further, the ribs may have a trapezoidal cross-section.

Advantageously, adjacent ribs are spaced apart by between 4 and 6 mm, and more preferably by between 4 and 5 mm. Most preferably, adjacent ribs are spaced apart by 4.4 mm. It should be noted that the spacing between each rib is commonly referred to as the pitch.

Preferably, the ribs have a height of between 0.45 and 0.75 mm. More preferably, the ribs have a height of between 0.5 and 0.6 mm. Most preferably, the ribs have a height of 0.52 mm.

Advantageously, the ribs may have a width of between 0.45 and 0.75 mm. Preferably, the ribs have a width of 0.6 mm.

Conveniently, the width of the gaps in the ribs may be in the range of 0.45 to 0.75 mm. In a preferred embodiment, the gaps in the ribs are 0.54 mm wide.

Preferably, the at least one channel is located in the region of the leading edge. This arrangement is particularly advantageous as the at least one channel including the ribs having the chevron junction gives greatly enhanced cooling of the leading edge region where thermal degradation of the blade most commonly occurs. Advantageously, the at least one channel in the region of the leading edge is defined by the pressure wall, the suction wall and a web portion extending between the pressure and suction walls.

Preferably, when the ribs are located in at least one channel in the region of the leading edge, one rib portion is located on the pressure wall, and the other rib portion is located on the suction wall, and the chevron junction is aligned with the leading edge.

Alternatively, the at least one channel may be located in a mid-passage of the blade, between the leading and trailing edges.

The blade may include a plurality of internal channels, at least one of which channels being located in the region of the leading edge, and at least one channel being located in a mid-passage of the blade, between the leading and trailing edges.

Conveniently, the at least one channel may be of a single pass form. Alternatively, the at least one channel may be of a serpentine form, or a combination of single pass and serpentine forms may be utilised.

Conveniently, the turbine blade may further include a root portion and a tip portion, wherein the pressure and suction walls and the leading and trailing edges extend from the root portion to the tip portion of the blade.

Preferably, the cooling medium is supplied to the blade via the root portion.

Preferably also, the root portion is of a fir-tree type. Alternatively, the root portion may be of a dove tail type, or any other type commonly used in the art.

Advantageously, the external surface of the turbine blade may define a plurality of apertures providing fluid communication between the at least one cooling channel and the exterior of the blade. Thus, cooling air internal of the blade may pass through the apertures to provide film cooling to the exterior surface of the blade.

Conveniently, the cooling medium may be air, and preferably compressed air fed from a compressor.

Advantageously, the turbine blade may be for use in a gas turbine engine.

Preferably, the turbine blade is a rotor blade. Alternatively, the turbine blade may be a stator or nozzle blade.

More preferably, the turbine blade is a first stage rotor blade.

According to a second aspect of the present invention, there is provided a gas turbine engine including a plurality of turbine blades, at least one turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, wherein each rib comprises two rib portions joined at one end thereof to form a chevron junction, said chevron junction defining an angle of between 80° and 120° between the two rib portions and being directed into the flow of the cooling medium within the at least one channel, and wherein each rib defines at least one gap therein.

According to a third aspect of the present invention, there is provided electrical generating means including a gas turbine engine, said gas turbine engine including a plurality of turbine blades, at least one turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, wherein each rib comprises two rib portions joined at one end thereof to form a chevron junction, said chevron junction defining an angle of between 80° and 120° between the two rib portions and being directed into the flow of the cooling medium within the at least one channel, and wherein each rib defines at least one gap therein.

According to a fourth aspect of the present invention, there is provided a turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, wherein at least one rib has a trapezoidal cross-sectional shape and extends from the channel wall surface at an angle greater than 60° and less than 90°, such that said at least one rib is directed into the flow of the cooling medium within the at least one channel.

Preferably, the at least one rib extends from the channel wall surface at an angle of between 62° and 79°.

Preferably also, the cross-sectional shape of the at least one rib is defined by a base and a tip joined by two flanks aligned parallel to each other.

According to a fifth aspect of the present invention, there is provided a turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, wherein at least one rib has a cross-sectional shape in the form of a parallelogram and extends from the channel wall surface at an angle greater than 60° and less than 90°, such that said at least one rib is directed into the flow of the cooling medium within the at least one channel.

Preferably, at least one rib extends from the channel wall surface at an angle of between 62° and 79°.

Conveniently, various features defined above in accordance with the first aspect of the present invention may be applied to the second to fifth aspects, but for the purposes of brevity such features have not been repeated.

These and other aspects of the present invention will now be described, by way of example only, with reference to the accompanying drawings, in which.

Figure 1:
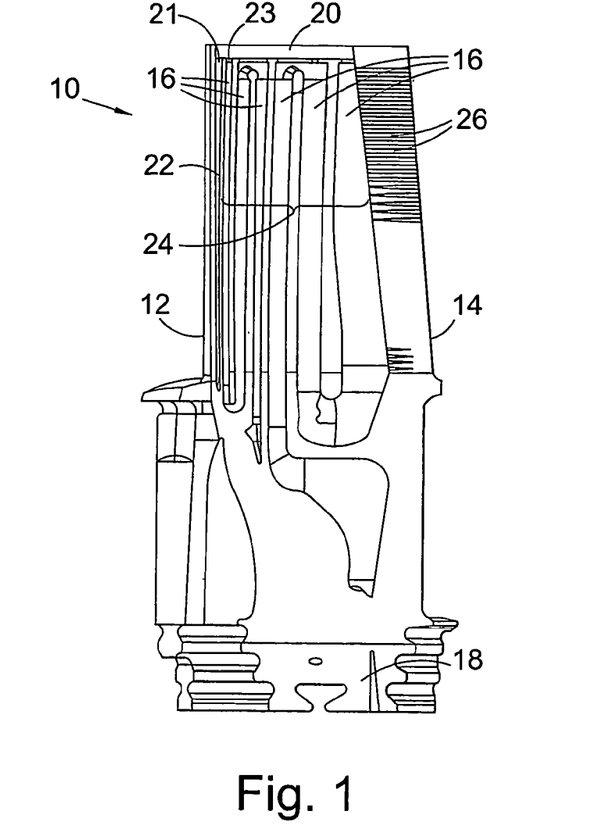
FIG. 1 is a longitudinal cross-sectional view of a turbine blade in accordance with one embodiment of the present invention.

Reference is first made to FIG. 1 of the drawings in which there is shown a cross-sectional view of a turbine blade, generally indicated by reference numeral 10, for use in a gas turbine engine in accordance with one embodiment of the present invention. The blade 10 is a first stage rotor blade and has opposing pressure and suction side walls adjoining at a leading edge 12 and a trailing edge 14 of the blade 10. The turbine blade 10 defines a number of internal channels 16, which channels provide a flow passage for a cooling medium, such as compressed air, to cool the blade 10 while in use. The blade also includes a root portion 18 and a tip portion 20, wherein the cooling medium is supplied to the internal channels 16 through the root portion 18. As shown, the root portion 18 is of a fir-tree type.

The internal channels 16 consist of a leading edge channel 22 and a number of mid-passage channels 24 located between the leading and trailing edges 12, 14 of the blade 10. The leading edge channel 22 is substantially triangular in cross-section and is a single pass channel aligned substantially parallel to the leading edge 12, wherein cooling air enters from the root portion 18, flows through the leading edge channel 22, and exits the blade through an aperture 21 in the tip portion 20 of the blade 10. The mid-passage channels 24 on the other hand are of a serpentine form, and provide a convoluted flow path for the cooling medium or air. Air flowing through the mid-passage channels 24 may exit the interior of the blade via apertures providing fluid communication between the channels 24 and the exterior of the blade, such as apertures 26 in the region of the trailing edge 14 of the turbine blade 10 or an aperture 23 in the tip portion 20 of the blade 10.

In the embodiment shown, the leading edge channel 22 includes a plurality of upstanding turbulence promoting ribs which seek to improve the heat transfer between the surfaces of the blade 10 and the cooling medium. The ribs 28 are shown in FIG. 2 in which there is shown an enlarged longitudinal cross-sectional view of the leading edge channel 22 of the turbine blade 10 of FIG. 1.

Each rib 28 comprises first and second rib portions 30, 32, which portions 30, 32 join at one end to form a chevron junction 34, wherein the arrangement is such that the first rib portion 30 is disposed at an angle 36 of around 120° from the second rib portion 32. The chevron junction 34 of each rib is directed into the flow of the cooling medium, the flow direction being indicated in FIG. 2 by arrow 38. Additionally, the chevron junctions 34 of each adjacent rib 28 are longitudinally aligned with respect to the channel flow direction 38.

Figure 2:
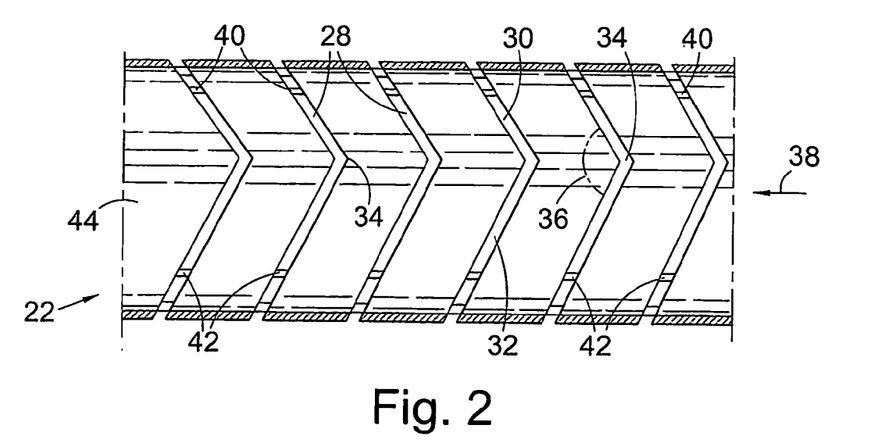
FIG. 2 is a longitudinal cross-sectional view of an internal channel of the turbine blade of FIG. 1.

Referring still to FIG. 2, each rib includes two gaps 40, 42 to further increase the turbulence in the flow of cooling medium, wherein the gaps 40, 42 of each rib 28 are longitudinally aligned with respect to the channel 22.

In the embodiment shown, adjacent ribs 28 are separated from each other, i.e. the rib pitch, by around 4.4 mm and extend from the surface 44 of the channel 22 by a height of approximately 0.52 mm. Additionally, the ribs 28 are approximately 0.6 mm wide, and the gaps 40, 42 in the ribs 28 are approximately 0.54 mm wide.

Furthermore, the centre of each gap 40, 42 in each rib 28 is located approximately two thirds along the length of each rib portion 30, 32 respectively from the chevron junction 34.

Figure 3:
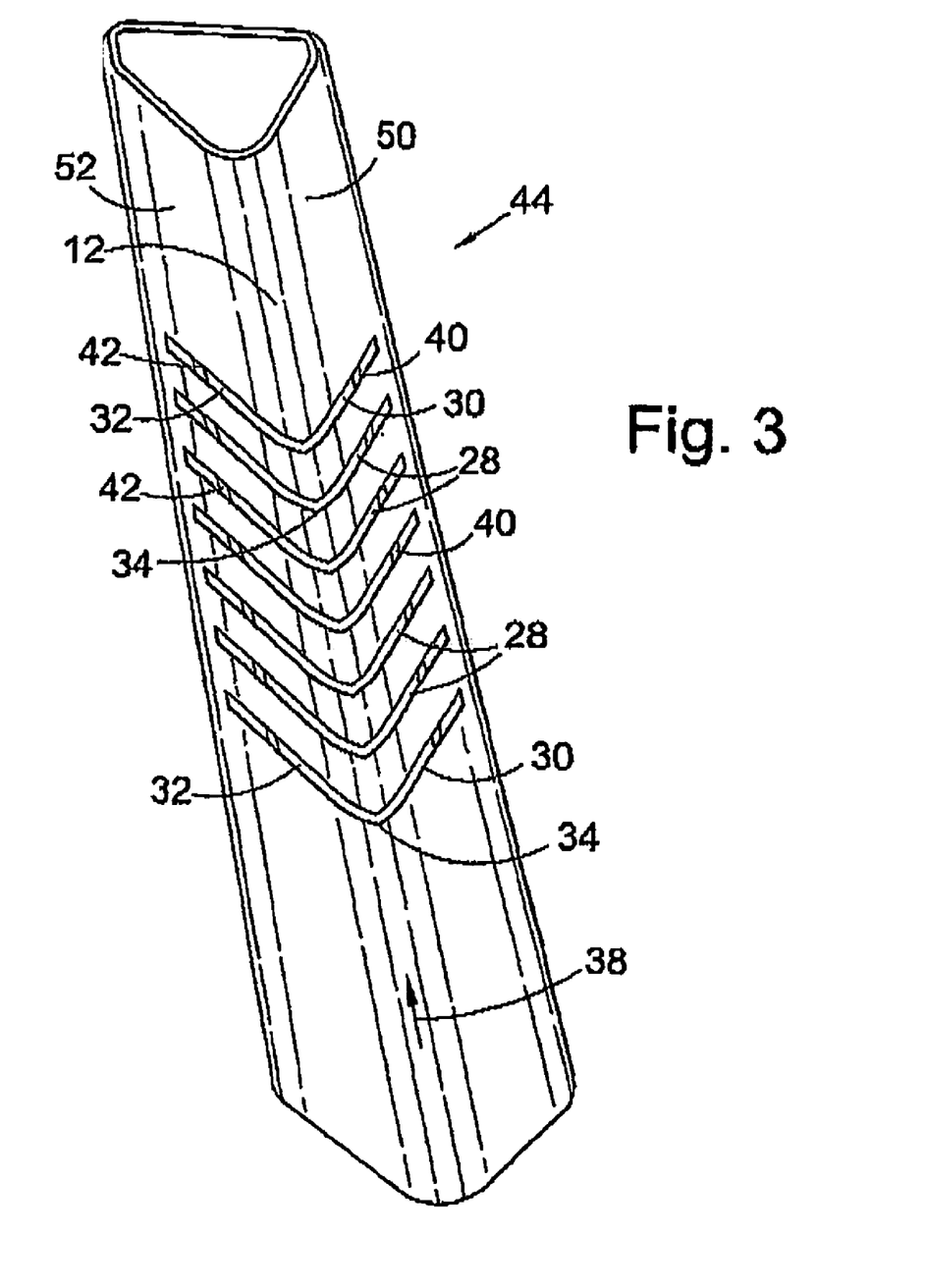
FIG. 3 is a perspective diagrammatic view of the channel shown in FIG. 2.

Reference is now made to FIG. 3 of the drawings in which a perspective diagrammatic view of the channel 22 is illustrated. As shown, the channel 22 is triangular in cross-section and includes a plurality of ribs 28, each comprising first and second rib portions 30, 32, which portions 30, 32 join at one end to form a chevron junction 34. The chevron junctions 34 are directed into the direction of flow 38 of cooling medium, and each junction 34 is aligned with the leading edge 12 of the blade 10.

In the embodiment shown, the first rib portion 30 is mounted on the suction wall 50, and the second rib portion 32 is mounted on the pressure wall 52.

As noted before, each rib includes two gaps 40, 42 which are longitudinally aligned with respect to the channel 22.

Figure 4:
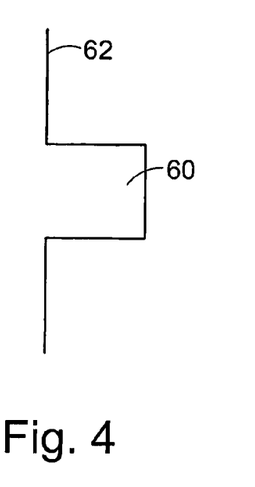
FIGS. 4 to 6 are diagrammatic representations of the form of cooling ribs according to various embodiments of the present invention.
Figure 5:
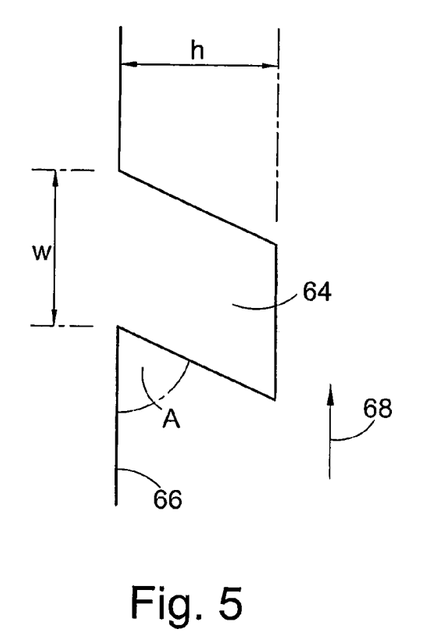
Figure 6:
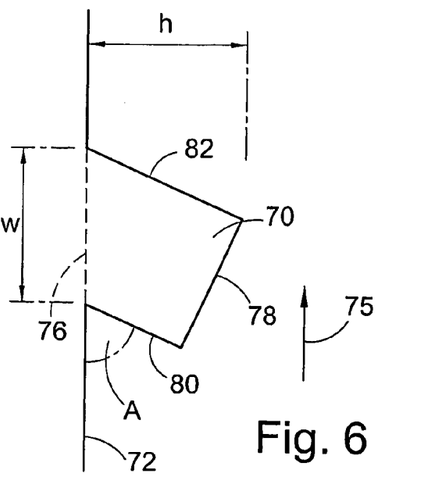

Reference is now made to FIGS. 4 to 6 of the drawings in which there is shown diagrammatic representations of the form of a cooling rib in accordance with different embodiments of the present invention. Referring initially to FIG. 4, there is shown a general form of a rib 60 that extends substantially perpendicular from the surface 62 of a cooling channel of a gas turbine blade.

Referring now to FIG. 5, a rib 64 defining a general parallelogram cross-sectional shape is shown. The rib 64 extends from the surface 66 of a cooling channel at an angle A of between 62° to 79° such that the rib 64 is directed into the flow direction of a cooling fluid, indicated by arrow 68. A similar arrangement to that of FIG. 5 is shown in FIG. 6. In this embodiment, a rib 70 defines a trapezoidal cross-sectional shape and extends from the surface 72 of a cooling channel at an angle A, as defined above, of between 62° to 79°. The cross-sectional shape of rib 70 is defined by a base 76, tip 78 and two flanks 80, 82, wherein the flanks 80, 82 are aligned parallel to each other. The rib 70 in FIG. 6 defines an angle B of approximately 90°. Thus as with the embodiment shown in FIG. 5, rib 70 of FIG. 6 is directed into the cooling flow direction, indicated by arrow 75. Directing the ribs 64, 70 into the direction of flow in this manner increases the turbulence created in the flow, and thus increases the heat transfer between the ribs 64, 70 and the cooling air. Additionally, directing the ribs in the manner described above with reference to FIGS. 5 and 6 allows the ribs to be formed with greater ease during the manufacturing process, particularly where the ribs are to be formed on the pressure and suction walls of the blade.

It should be obvious to a person of skill in the art that the above described embodiments are merely exemplary of the present invention and that various modifications may be made thereto without departing from the scope of the present invention. For example, the chevron junction 34 may define any suitable angle between first and second rib portions 30, 32, and may be directed in line with the flow of cooling medium. Additionally, any number of gaps may be provided in the ribs, and the gaps of each adjacent rib may be offset or staggered. Furthermore, the rib pitch may vary or be selected as required and is not necessarily restricted to the value given above. Similarly, the height and width of each rib, and the width of the gaps in each rib may vary.

The ribs of the turbine blade of the present invention have been shown in the accompanying representations in the leading edge channel 22. However, the particular form of ribs described herein may be used within the mid-passage channels 24, either in addition to or in place of those in the leading edge channel.

Figure 7:
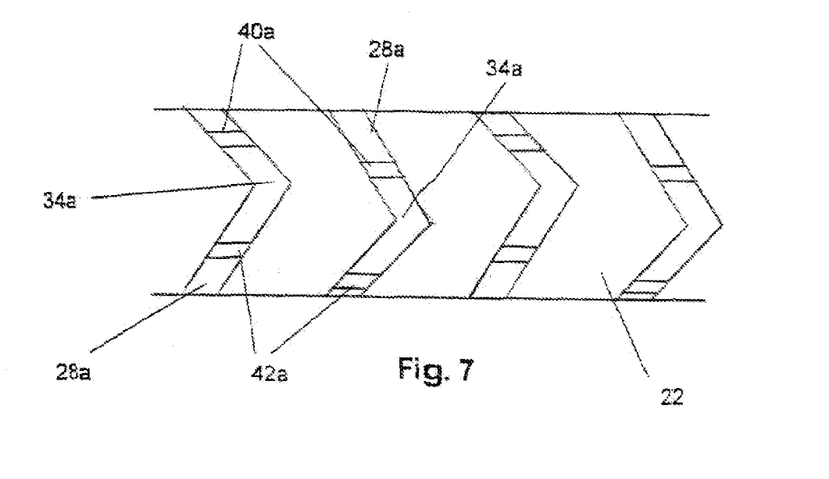
FIGS. 7 to 9 are partial schematic views of various embodiments of the present invention.

Various further alternative embodiments will be described with reference to FIGS. 7 to 9. Referring initially to FIG. 7, the cooling channel 22 (FIG. 1) is shown which includes a plurality of cooling ribs 28a which are similar to cooling ribs 28 shown in FIG. 2 and as such each include a chevron junction 34a and gaps 40a, 42a. In this embodiment the chevron junctions 34a and gaps 40a, 42a of adjacent ribs 28a are longitudinally offset.

Figures 8, 9:
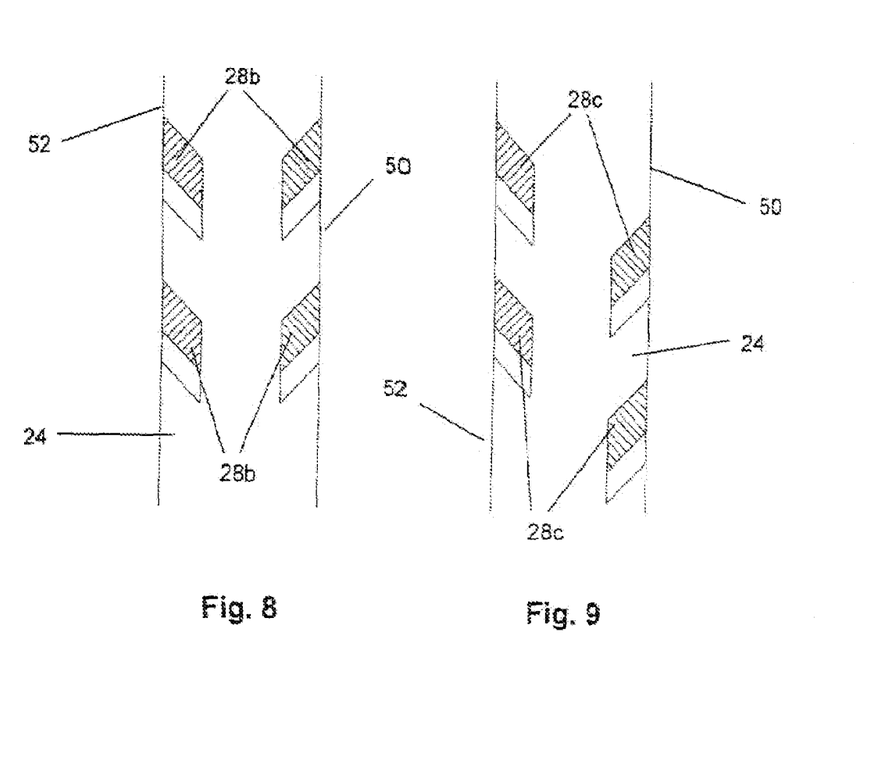

Referring to FIG. 8, an intermediate cooling channel 24 (FIG. 1) is shown in longitudinal cross section such that the opposing suction and pressure side walls 50, 52 may be identified. In this embodiment ribs 28b are provided on each wall 50, 52 and are arranged such that opposing ribs 28b are laterally aligned with respect to the channel 24. An alternative arrangement is shown in FIG. 9 in which opposing ribs 28c are laterally misaligned with respect to the channel.

The invention claimed is:

1. A turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, at least one of the ribs extending at an angle of between 62° and 79° from the surface of the at least one channel with respect to the direction of flow therethrough, wherein each rib comprises two rib portions joined at one end thereof to form a chevron junction, said chevron junction defining an angle of between 80° and 120° between the two rib portions and being directed into the flow of the cooling medium within the at least one channel, and wherein at least one gap is provided in one rib portion, and at least one gap is provided in the other rib portion.

2. A turbine blade as claimed in claim 1, wherein one rib portion is disposed at an angle of 120° from the other rib portion.

3. A turbine blade as claimed in claim 1, wherein the at least one channel has a substantially triangular cross-section.

4. A turbine blade as claimed in claim 1, wherein adjacent ribs are aligned such that adjacent chevron junctions are longitudinally aligned with respect to the at least one channel.

5. A turbine blade as claimed in claim 1, wherein adjacent ribs are misaligned such that adjacent chevron junctions are longitudinally offset.

6. A turbine blade as claimed in claim 1, wherein the ribs are mounted on opposing sides of the at least one channel.

7. A turbine blade as claimed in claim 6, wherein each opposing rib is laterally aligned with respect to the at least one channel.

8. A turbine blade as claimed in claim 6, wherein each opposing rib is laterally offset with respect to the at least one channel.

9. A turbine blade as claimed in claim 1, wherein the gaps of each adjacent rib are longitudinally aligned with respect to the at least one channel.

10. A turbine blade as claimed in claim 1, wherein the gaps in each adjacent rib are longitudinally offset with respect to the at least one channel.

11. A turbine blade as claimed in claim 1, wherein the centre of the at least one gap is located between 60% and 70% along the length of a respective rib portion from the chevron junction.

12. A turbine blade as claimed in claim 1, wherein the centre of the at least one gap is located around two thirds along the length of a respective rib portion from the chevron junction.

13. A turbine blade as claimed in claim 1, wherein at least one of the ribs extends substantially perpendicular from the surface of the at least one channel.

14. A turbine blade as claimed in claim 1, wherein the ribs have a trapezoidal cross-section.

15. A turbine blade as claimed in claim 1, wherein the ribs have a cross-section in the form of a parallelogram.

16. A turbine blade as claimed in claim 1, wherein the ribs have a square cross-section.

17. A turbine blade as claimed in claim 1, wherein adjacent ribs are spaced apart by between 4 and 5 mm.

18. A turbine blade as claimed in claim 1, wherein adjacent ribs are spaced apart by between 4 and 5 mm.

19. A turbine blade as claimed in claim 1, wherein adjacent ribs are spaced apart by 4.4 mm.

20. A turbine blade as claimed in claim 1, wherein the ribs have a height of between 0.45 and 0.75 mm.

21. A turbine blade as claimed in claim 1, wherein the ribs have a height of between 0.5 and 0.6 mm.

22. A turbine blade as claimed in claim 1, wherein the ribs have a height of 0.52 mm.

23. A turbine blade as claimed in claim 1, wherein the ribs have a width of between 0.45 and 0.75 mm.

24. A turbine blade as claimed in claim 1, wherein the ribs have a width of 0.6 mm.

25. A turbine blade as claimed in claim 1, wherein the gaps in the ribs are between 0.45 and 0.7.5 mm wide.

26. A turbine blade as claimed in claim 1, wherein the gaps in the ribs are 0.54 mm wide.

27. A turbine blade as claimed in claim 1, wherein the at least one channel is located in the region of the leading edge of the blade.

28. A turbine blade as claimed in claim 1, wherein the at least one channel is defined by the pressure wall, the suction wall and a web portion extending between the pressure and suction walls.

29. A turbine blade as claimed in claim 1, wherein the ribs are located in at least one channel in the region of the leading edge of the blade, such that one rib portion is located on the pressure wall, and the other rib portion is located on the suction wall, and the chevron junction is aligned with the leading edge.

30. A turbine blade as claimed in claim 1, wherein the at least one channel is located in a mid-passage of the blade, between the leading and trailing edges of the blade.

31. A turbine blade as claimed in claim 1, wherein the blade includes a plurality of internal channels.

32. A turbine blade as claimed in claim 31, wherein at least one of the plurality of channels is located in the region of the leading edge of the blade, and at least one channel is located in a mid-passage of the blade, between the leading and trailing edges.

33. A turbine blade as claimed in claim 1, wherein the at least one channel is of a single pass form.

34. A turbine blade as claimed in claim 1, wherein the at least one channel is of a serpentine form.

35. A turbine blade as claimed in claim 1, wherein the turbine blade further includes a root portion and a tip portion, wherein the pressure and suction walls and the leading and trailing edges extend from the root portion to the tip portion of the blade.

36. A turbine blade as claimed in claim 35, wherein the cooling medium is supplied to the blade via the root portion.

37. A turbine blade as claimed in claim 35, wherein the root portion is of a fir-tree type.

38. A turbine blade as claimed in claim 35, wherein the root portion is of a dove tail type.

39. A turbine blade as claimed in claim 1, wherein the external surface of the turbine blade defines a plurality of apertures providing fluid communication between the at least one cooling channel and the exterior of the blade.

40. A turbine blade as claimed in claim 1, wherein the cooling medium is air.

41. A turbine blade as claimed in claim 1, wherein the cooling medium is compressed air fed from a compressor.

42. A turbine blade as claimed in claim 1, wherein the turbine blade is a rotor blade of a gas turbine engine.

43. A turbine blade as claimed in claim 1, wherein the blade is a first stage rotor blade of a gas turbine engine.

44. A gas turbine engine including a plurality of turbine blades, at least one turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, at least one of the ribs extending at an angle of between 62° and 79° from the surface of the at least one channel with respect to the direction of flow therethrough, wherein each rib comprises two rib portions joined at one end thereof to form a chevron junction, said chevron junction defining an angle of between 80° and 120° between the two rib portions and being directed into the flow of the cooling medium within the at least one channel, and wherein at least one gap is provided in one rib portion, and at least one gap is provided in the other rib portion.

45. Electrical generating means including a gas turbine engine, said gas turbine engine including a plurality of turbine blades, at least one turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, at least one of the ribs extending at an angle of between 62° and 79° from the surface of the at least one channel with respect to the direction of flow therethrough, wherein each rib comprises two rib portions joined at one end thereof to form a chevron junction, said chevron junction defining an angle of between 80° and 120° between the two rib portions and being directed into the flow of the cooling medium within the at Least one channel, and wherein at least one gap is provided in one rib portion, and at least one gap is provided in the other rib portion.

46. A turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, wherein at least one rib has a trapezoidal cross-sectional shape and extends from the channel wall surface at an angle greater than 60° and less than 90°, such that said at least one rib is directed into the direction of flow of the cooling medium within the at least one channel.

47. A turbine blade as defined in claim 46, wherein the at least one rib extends from the channel wall surface at an angle of between 62° and 79°.

48. A turbine blade as defined in claim 46, wherein the cross-sectional shape of the at least one rib is defined by a base and a tip joined by two flanks aligned parallel to each other.

49. A turbine blade having opposing pressure and suction side walls adjoining at leading and trailing edges of the blade, and defining at least one internal channel providing a flow passage for a cooling medium, said at least one channel including a plurality of turbulence promoting ribs mounted on a channel wall surface, wherein at least one rib has a cross-sectional shape in the form of a parallelogram and extends from the channel wall surface at an angle greater than 60° and less than 90°, such that said at least one rib is directed into the direction of flow of the cooling medium within the at least one channel.

50. A turbine blade as defined in claim 49, wherein the at least one rib extends from the channel wall surface at an angle of between 62° and 79°.

* * * * *

UNITED STATES PATENT AND TRADEMARK OFFICE
CERTIFICATE OF CORRECTION

PATENT NO.      : 7,347,671 B2                                  Page 1 of 1
APPLICATION NO. : 10/528896
DATED           : March 25, 2008
INVENTOR(S)     : Kevin Dorling et al.

It is certified that error appears in the above-identified patent and that said Letters Patent is hereby corrected as shown below:

Column 8, line 6, after "between 4 and" delete "5mm" and insert --6mm--

Column 8, line 22, after "0.45 and" delete "0.7.5mm" and insert --0.75mm--

Signed and Sealed this

Fifth Day of August, 2008

JON W. DUDAS
*Director of the United States Patent and Trademark Office*